MULTIPLE ROTATING BEAMS RADIO GUIDING SYSTEMS

Filed Aug. 21, 1963 4 Sheets-Sheet 3

United States Patent Office 3,298,026

Patented Jan. 10, 1967

3,298,026

MULTIPLE ROTATING BEAMS RADIO GUIDING SYSTEMS

Paul Fombonne, Paris, France, assignor to CSF-Compagnie Generale de Telegraphie Sans Fil, a corporation of France Filed Aug. 21, 1963, Ser. No. 303,556
Claims priority, application France, Aug. 23, 1962, 907,604/62
13 Claims. (Cl. 343—106)

The present invention relates to radio guiding systems.

The definition of an angular coordinate by the equality along this coordinate of the respective fields of two radiation lobes, is an old technique used in many applications and in various forms. One of its most remarkable applications is in radio-guiding systems, such as localiser and glide path guiding systems for the aircraft. Certain known systems of this type use either two lobes issuing from the same point, or two lobes having separate origins and being symmetrical about the median plane of the segment limited by the two origins.

This technique can be considered as one application of a more general process in which an angular coordinate would be defined by a given ratio, not necessarily equal to unity, of the respective fields of the two lobes. Two pairs of lobes would then define an infinite number of trajectories.

But such possibilities are purely theoretical. In particular, as soon as one leaves the classical case in which a plane is defined by the intersection of two lobes symmetrical about that plane, one meets with difficulties in obtaining the desired lobes. For example, it is difficult to obtain a fixed ratio $k \neq 1$ between the fields of two lobes for a given azimuth over a large elevation range.

Another drawback lies in the fact that the lobes illuminate a wide zone about the point of measurement so that the measurement is perturbed by stray signals, due to reflection from illuminated obstacles. The axes defined by a constant field ratio are then distorted, often considerably so.

The present invention overcomes these drawbacks and ensures considerable freedom in the choice of trajectories.

According to the invention, a surface $So$ is defined by two movable beams each of which has a surface of maximum radiation, say S1 and S2; each of surfaces S1 and S2 during the motion of the corresponding beam, coincide at a given instant with surface $So$ or sweep it; one characteristic of the first beam reproduces a magnitude E1 which is a function of an angular coordinate $p1$ defining the instantaneous position of surface S1, and a corresponding characteristic of the second beam reproduces a magnitude E2 which is a function, which may be a constant, of an angular coordinate $p2$ defining the position of surface S2, so that surface $So$ is characterized by a fixed value of a ratio $E1r/E2r$, in which ratio values E1$r$ and E2$r$ are those taken on by magnitudes E1 and E2 for each point of the space portion swept by the system, when said point is respectively on surfaces S1 and S2; the receiver carried by a moving body, such as an aircraft, is provided with a device which generates from the signals received during the time the aircraft is swept by the two beams, two signals $e1$ and $e2$ such that $e1/e2=E1r/E2r$ for the position of the aircraft, and stores this ratio or an error signal which is a function of the difference between the actual value and the desired value of this ratio.

By surface of maximum radiation is meant a surface, for example plane or conical, including the transmitter and such that any straight line extending through the transmitter and situated on this surface is the axis of maximum radiation in the plane passing through this line and normal to the surface of maximum radiation.

It should be noted that the device for measuring $e1/e2$ can supply either an error signal with respect to a desired position of the aircraft, or an indication of its actual position.

Also, among all the obstacles present in the space portion served, only those between the transmitter and the receiver concerned are harmful.

Other advantages and other characteristics of the invention will become apparent from the following description and appended drawings in which:

FIGURES 1$a$ and 1$b$ show the principle of prior art conventional radio alignment systems;

FIGURES 2$a$ and 2$b$ show the principle of a radio alignment system according to the invention;

FIGURE 3 shows the principle of a distance measurement using the determination of angular coordinates according to the invention;

FIGURES 4$a$ and 4$b$ show the layout of a radio landing arrangement according to the invention;

Figure 8A:
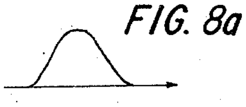
Figure 8B:
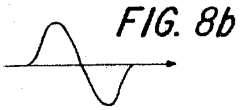
Figure 6:
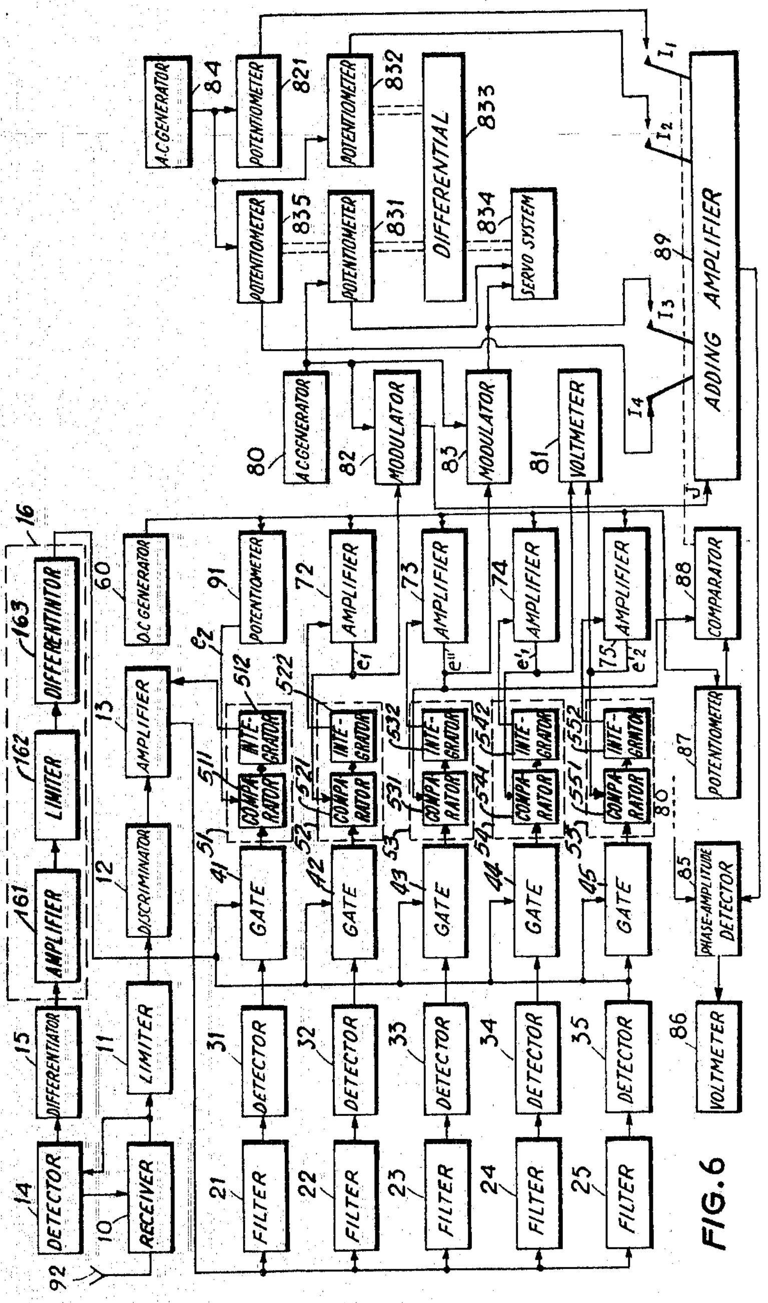
FIGURE 6 is the circuit diagram of a radio landing receiver intended for the arrangement of FIGURE 4.
Figures 7, 9:
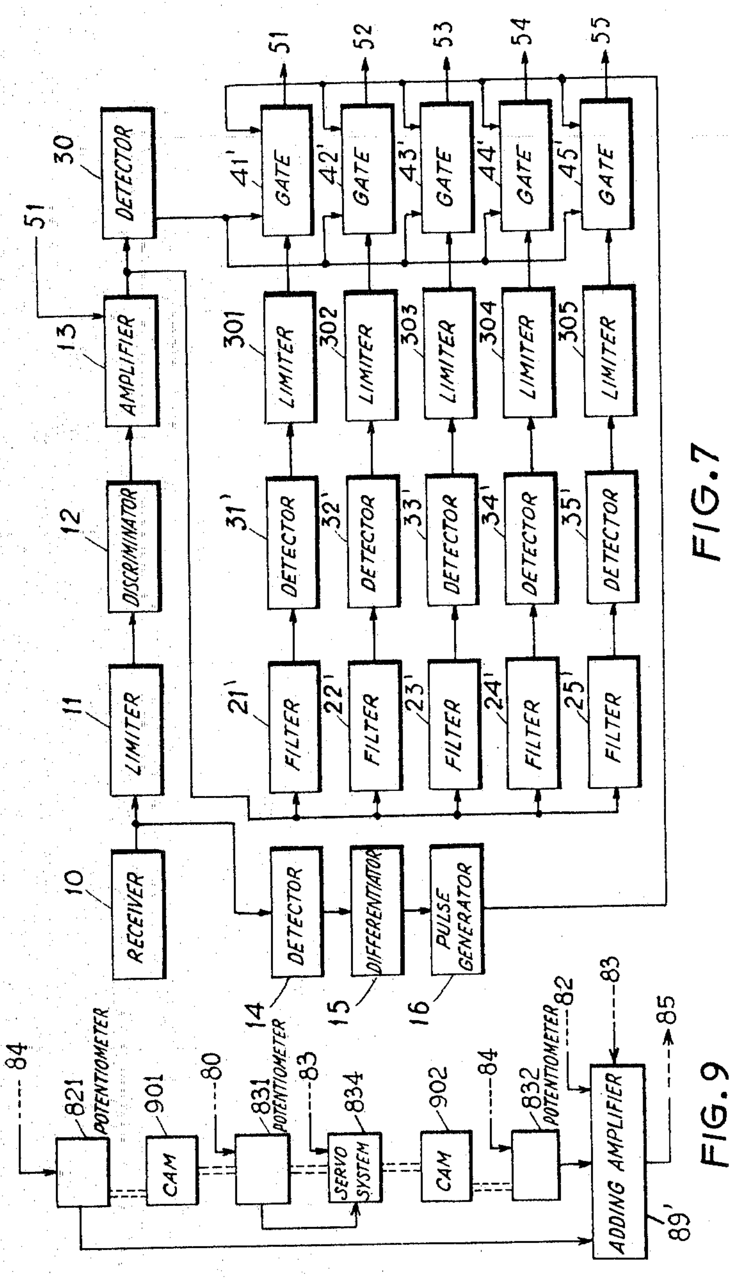
FIGURE 7 illustrates a modification of the receiver of FIGURE 6.

FIGURES 8$a$ and 8$b$ are diagrams illustrating the operation of the receivers of FIGURES 6 and 7; and FIGURE 9 illustrates a modification of the receivers of FIGURES 6 and 7.

Figure 1A:
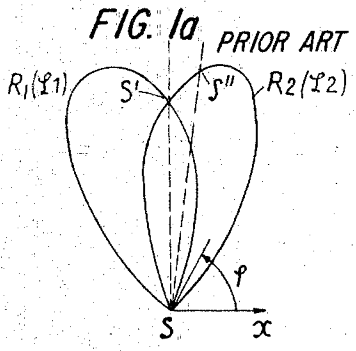

FIGURE 1$a$ shows two lobes in the plane of the figure having a common origin S. The lobes are shown in polar coordinates R1, $\varphi1$ and R2, $\varphi2$ with respect to origin S and axis S$x$.

Two such diagrams give rise in the receiver, assumed to be situated in the plane of the figure, to fields whose ratio is equal to $R1/R2$, the distance factor acting in the same way for both lobes. If the lobes are symmetrical about the plane normal to the plane of the figure and extending along line SS′, which joins origin S to the point of intersection S′ of the two lobes, this plane is defined by the equality of the measured fields. If it is desired to use these lobes to define another plane, perpendicular to the plane of the figure and whose trace is SS″, with $R1/R2=k\neq1$ in the plane of the figure, this requires the sections of the two lobes in this plane to be curves homothetic with respect to point S in ratio $k$. It will be appreciated that it is difficult to produce lobes whose respective radiations meet this requirement.

FIGURE 1$b$ shows the radiation lobes of the two sources of respective origins D and G, which are symmetrical about the median plane of line DG and whose trace in the plane of the figure is shown in dotted line.

The lobe of origin G is drawn in polar coordinates R1, $\theta1$ with respect to point G and the axis G$z_1$ normal to DG. The lobe of origin D is drawn in polar coordinates R2, $\theta2$ with respect to point D and the axis D$z_2$.

If the two lobes are symmetrical about the median plane of segment DG, the equality of the fields, respectively collected in the two lobes at a given point defines this median plane.

A constant ratio of the fields produced by the two lobes defines a curve from a family of trajectories depending on the shape of the two lobes in this plane.

It should be noted that, in this case, the ratio of the measured fields is no longer equal to the ratio of the radiations in directions DM and GM for a point M which is not situated in the median plane of DG, since the distance factor does not then have the same effect on the two lobes, the trajectories not being therefore defined in as simple a manner as in the case of FIG. 1.

FIGURES 2$a$ and 2$b$ illustrate the principle of a system according to the invention, for the determination of a surface.

Figure 2A:
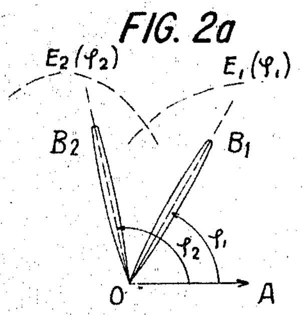

FIGURE 2a showns the radiation patterns in the plane of the figure, of two identical beams, of narrow section in a direction parallel to the plane of the figure. Their traces are closed curves $OB_1$ and $OB_2$. The two beams rotate about an axis OY of trace O, normal to the plane of the figure. One characteristic of the first beam varies according to a function $E1(\varphi 1)$, where $\varphi 1$ is the angle of the half-plane $OyB_1$ with the fixed half-plane OyA; a corresponding characteristic of the second beam varies according to a function $E2(\varphi 2)$, where $\varphi 2$ is the angle of the half-plane $OyB_2$ with the half-plane OyA, although this second function may also come down to a constant.

As already mentioned, the receiver generates, from the signals received as the moving body, for example an aircraft, is being swept by the beams, two signals $e1$ and $e2$, such that $e1/e2=E1r/E2r$, where $E1r$ and $E2r$ are the values taken by E1 and E2 as the aircraft is being swept by surfaces S1 and S2 of the two beams. It will thus be seen that a plane can be defined, which is, for example, normal to the plane of the figure, passes through the origin O and makes an angle $\varphi o$ with the half-plane OyA. For example, it suffices to take $E1(\varphi 1)=\varphi 1$, $$E2=\text{constant}=\varphi o,$$

and $k=E1r/E2r=1$.

It may be noted that $E1(\varphi)=\varphi 1$ and $E2=\varphi o$ define then two cylindrical lobes, with generatrices perpendicular to the plane of the figure and whose traces in this plane are respectively a spiral and a circle, or an arc of a spiral and an arc of a circle.

It is also possible to define simultaneously a plurality of planes, for example by making as above $E1=\varphi 1$ and $E2=\text{constant}=\varphi o$, the various planes being defined at the receiver by different values of $E1r/E2r$.

In this arrangement where the surfaces of maximum radiation S1 and S2 sweep in the same way a space portion, any surface So necessarily coincides with one of the positions taken on by S1 and S2 during their respective sweeps, this plane being normal to the plane of the figure and passing through O.

Figure 1B:
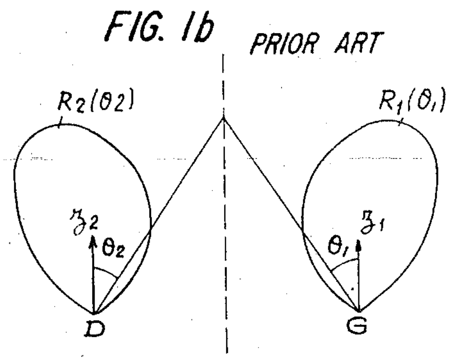
Figure 2B:
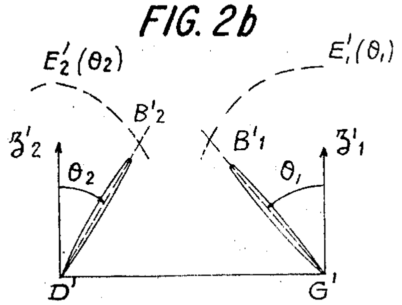

Such is not the case in the modification of FIGURE 2b, where the same angular coordinates are used as in FIGURE 1b.

FIGURE 2b shows the radiation patterns in the plane of the figure of two sources positioned at the origin D′ and G′ respectively. These lobes are respectively symmetrical about planes S′1 and S′2, whose traces in the plane of the figure are G′B′1 and D′B′2 and which are normal to this plane. They rotate respectively about axes G′y′1 and D′y′2 whose traces are G′ and D′ and which are normal to the plane of the figure, and their positions are respectively defined by the angle $\theta 1$ of the half-plane G′y′1B′1 with the half-plane G′y′1 z′1, where G′z′1 is the axis normal to D′G′ in the plane of the figure, and by the angle $\theta 2$ of the half-plane D′y′2 B′2 with the half-plane D′y′2z′2, where D′z′2 is the axis normal to D′G′ in the plane of the figure. $\theta 1$ and $\theta 2$ are reckoned positive in opposite directions, so that $\theta 1=\theta 2$ corresponds to symmetrical positions of D′B′2 and G′B′1 with respect to a line perpendicular to D′G′ at the midpoint thereof.

One characteristic of the first beam varies as $E'1(\theta 1)$ and one corresponding characteristic of the second beam as $E'1(\theta 2)$.

By making $E'1=\theta 1$ and $E'2=\theta 2$, ratio $E'1r/E'2r=1$ defines the median plane of segment D′G′.

As before, the subscript $r$ indicates that these values are those taken on by E′1 and E′2 when the point of space considered lies on surfaces S′1 and S′2 respectively.

More generally, by suitably selecting the characteristics which reproduce E′1 and E′2, it is possible to define conveniently any cylindrical surface with a generatrix normal to the plane of the figure and whose trace in this plane can be expressed by a relation of the form $f(\theta 1)=g(\theta 2)$, provided the characteristics are such that the receiver is capable of deducing from the received signals the signals $e'1/e'2=E'1r/E'2r$.

For all that is required is to make $E'1(\theta 1)=f(\theta 1)$, $E'2(\theta 2)=g(\theta 2)$ and $E'1r/E'2r=1$.

In the arrangement of FIGURE 2a, the defined plane So coincided with one of the positions occupied by planes S1 and S2 in the course of their rotation and the constant ratio $E1r/E2r$ was obtained with fixed values of $E1r$ and $E2r$. In the arrangement of FIGURE 2b, the surface So is defined, so to speak, generatrix by generatrix, the ratio $E'1r/E'2r$ remaining constant but the values of $E'1r$ and $E'2r$ which verify this ratio being variable.

In the case of FIGURE 2a, as in the case of FIGURE 2b, the rates of sweep may have any value, and need even not be constant. It is preferable that the receiver should be swept through regularly and at mean frequencies which are equal for the two beams in order to simplify the design of the gain control circuits, but this is not an essential requirement.

The aperture of the beams in the plane normal to the plane of the figure depends on a number of considerations and in particular on the extent of the surface So to be defined, and so on the volume served.

Transmissions are interlaced or not interlaced, depending on their discrimination possibilities.

The characteristics of the beam which vary according to functions E1 and E2 (or E′1 and E′2) may be quite diverse. One may use a characteristic of the carrier, such as its amplitude, its frequency departure from a central frequency, or its phase. One may also use a characteristic of a signal modulating the carrier. In other words, the carrier may be modulated directly by the information, or it may be modulated by a low-frequency signal carrying the information.

For both beams, the characteristics have to be so selected that the receiver is capable of distinguishing between the two signals and of deriving therefrom signals $e1$ and $e2$ such that $e1/e2=E1r/E2r$.

Figure 3:
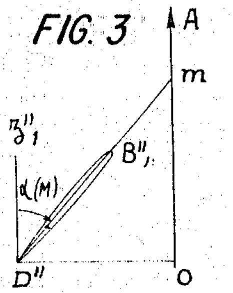

FIGURE 3 shows one example of the application of the system according to the invention to distance measurement.

Two identical beams of origin D″ rotate about axis D″y″ perpendicular to the plane of the figure and the trace of which in this plane is D″. The first beam is symmetrical about the plane of its maximum radiation S′1, which is normal to the plane of the figure and whose trace is this plane is D″B″1. Its position is defined by the angle $\alpha 1$ of plane S″1 with the plane D″y″z″1, with D″z″1 in the plane of the figure. The second beam, not shown, is identical to the first, and its position is defined by the angle $\alpha 2$ of the plane of maximum radiation S″2 with plane D″y″z″1.

An aircraft M is caused to remain constantly in a plane parallel to plane D″y″z″1 whose trace OA is situated at a distance $p$ from D″z″1. The aircraft M is projected at $m$ on the axis OA. It is further assumed that $Mm$ is small compared to D″M, so that the distance $r=OM$ can be assimilated to $Om$; $\alpha$ (M) being the angle of the half-plane D″y″M with D″y″z″1, then:

$$r=p/\tan \alpha\,(M)$$

By varying a characteristic of the first beam as a function of $E''(\alpha 1)$, a corresponding characteristic of the second beam reproducing a constant $E''2$, a half-plane passing through D″y″ and forming an angle $\alpha' o$ with the half-plane D″y″z″, is defined by a given value of ratio $E''r/E''2r$. Thus, the determination of the ratio $e''1/e''2=E''1r/E''2r$ supplies the receiver at M with the indication of the value of $\alpha$ (M), hence of the distance from O.

FIGURE 4 shows the layout of the ground installation of a radio landing system according to the invention, using the various arrangements illustrated in FIGURES 2 and 3.

Figures 4A, 4B:
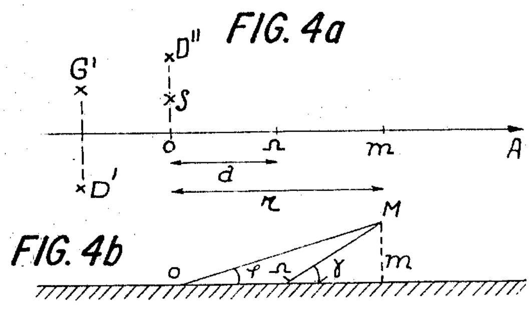

In FIGURE 4a, line OA is the trace in the horizontal plane of a vertical plane P$a$ in which aircraft M, whose projection on the ground is $m$, has to land.

This vertical plane is defined by two transmitters D′ and G′, situated symmetrically with respect to line OA in accordance with the teaching of FIGURE 2$b$. Two beams rotate about vertical axes, whose traces are D′ and G′, and have respective planes of symmetry S′1 and S′2, whose instantaneous positions are defined by their azimuths $\theta 1$ and $\theta 2$, with respect to the vertical planes parallel to OA and passing respectively through D′ and G′.

The functions E′1 ($\theta 1$) and E′2 ($\theta 2$), which are information carried by two beams, are such that $E'1=E'2$ for $\theta 1=\theta 2$; for example, one may take $E'1=\pi/2-\theta 1$ and $E'2=\pi/2-\theta 2$, the angles being reckoned positive in opposite directions. The plane P$a$, the trace of which is OA, is then defined by $e'1/e'2=E'1r/E'2r=1$.

In this plane the elevation of a point M, seen from point O of line OA, is defined by means of an arrangement of the type shown in FIGURE 2$a$ with two transmitters situated at point S, whose projection on axis OA is O.

FIGURE 4$b$ shows in the vertical plane P$a$, the trace of which is OA, aircraft M, its projection $m$ on OA, point O and the elevation $\varphi$ of aircraft M as seen from point O. The first beam transmitted from S has a plane of symmetry and of maximum radiation S1 passing through SO and rotates about SO, its instantaneous position being defined by angle $\varphi 1$ of S1 with the horizontal plane. The second beam, identical to the first also rotates about SO and its instantaneous position is defined by angle $\varphi 2$ of its plane of symmetry S2 with the horizontal plane. One characteristic of the first beam varies as $E1(\varphi)=\log a\varphi 1$, where $a$ is a constant, the corresponding characteristic of the second beam having a constant value E2.

The radiation patterns of these two beams in the vertical plane of trace OA have the shape shown in FIGURE 2$a$.

In FIGURE 4$a$, point D″ of line SO is the location of the distance measuring transmitter D″. A beam issuing from D″ has a plane of symmetry S″, passing through the vertical D″$y$″ and rotating about it; one characteristic of this beam varies as $E''1(\alpha 1)=\log p\ b/\tan \alpha 1$, where $p$ is equal to the distance D″O and $\alpha 1$ is the angle of the plane of symmetry S″ and of the vertical plane, passing through D″ and parallel to OA, and $b$ is a constant. Assimilating the distance $r$=OM to O$m$, which is justified if the aircraft is at a low elevation angle seen from point O, one has, for an aircraft situated in planes P$a$ and S″, $E''1=\log b\ r$. There can be added a second beam, identical to the first and rotating in the same way about the same axis, its characteristic reproducing $E''2$=constant. It will in actual fact be observed that if the coverage in azimuth $\alpha$ of the second beam for the measurement of elevation is sufficient, this beam can also be used as a "second beam" for the beam of characteristic E″1 ($\alpha 1$), since all that is necessary is to give E″2 a constant value. This will now be assumed to be so and the function reproduced by the characteristic of the single beam of origin D″ will be designated, without a numerical suffix, by E″ ($\alpha 1$).

Figure 5:
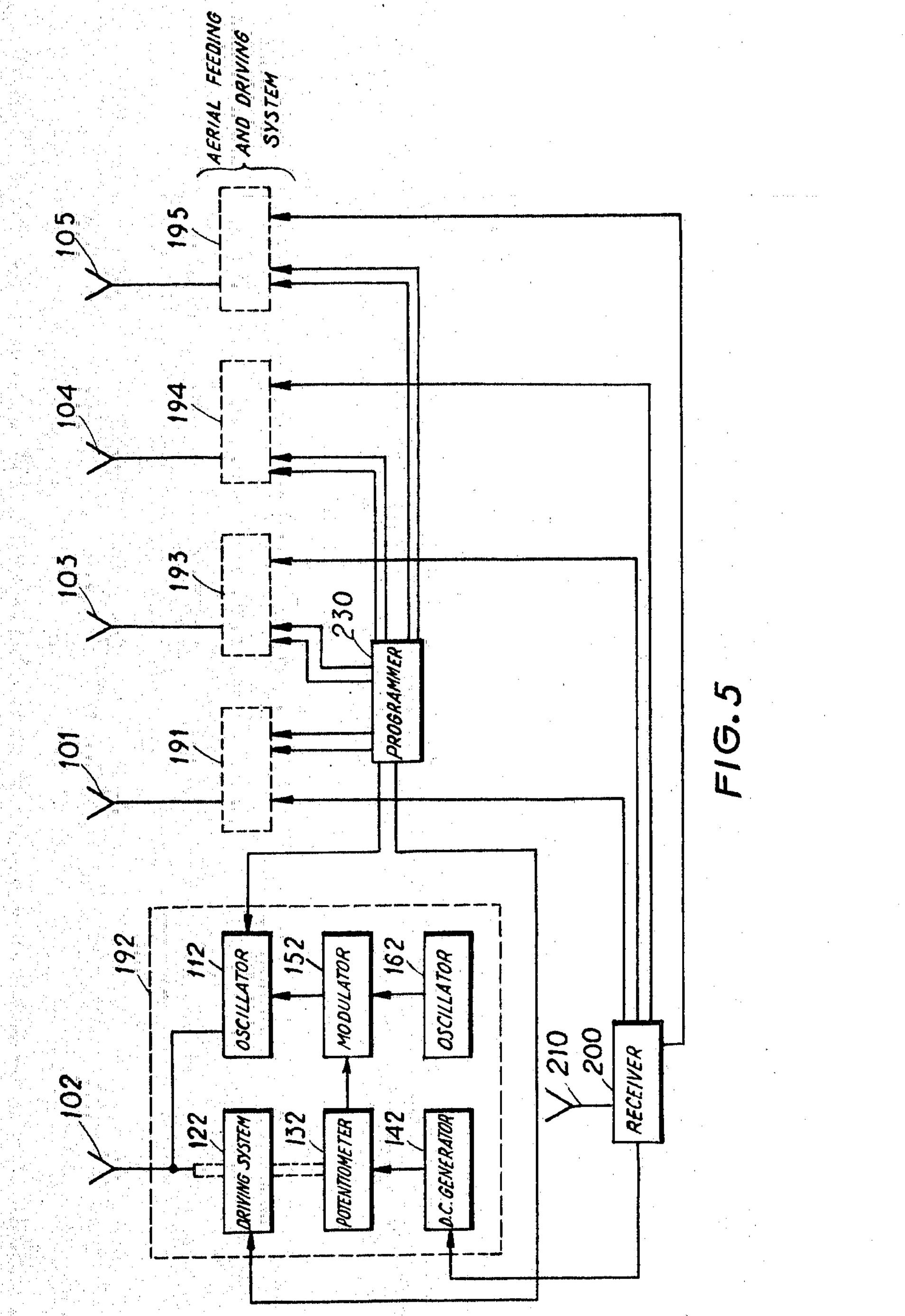
FIGURE 5 is the circuit diagram of the transmitting system of the arrangement shown in FIGURE 4.

FIGURE 5 shows an embodiment of the corresponding transmitting arrangement in which five aerials 101 to 105 are used for producing respectively the beams whose characteristics correspond to functions:

E2 ($\varphi 2$) for aerial 101
E1 ($\varphi 1$) for aerial 102
E″ ($\alpha 1$) for aerial 103
E′1 ($\theta 1$) for aerial 104
E′2 ($\theta 2$) for aerial 105

In this case the frequency of the carrier wave is the same for the five beams which are therefore transmitted consecutively. For each beam, the characteristic is, in this example, the level of a signal which is at every instant proportional to the value taken on by the function to be reproduced, and which modulates in amplitude a low-frequency wave which itself modulates the carrier wave in frequency.

In order to distinguish between the five beams, the frequency of the low-frequency wave is different for each beam.

Aerials 101 to 105 are fed and driven by systems 191 to 195 respectively. Since these systems are similar, the structure of only one of them has been shown in detail, i.e. the structure of system 192. System 192 includes a conventional electromechanical arrangement 122 for rotating the antenna which is mechanically coupled to it by a coupling, shown is dotted line, which gives the desired oscillatory motion in elevation to it. Antenna 102 is fed by an oscillator 112 whose frequency varies linearly as a function of the control voltage applied to it. For example, oscillator 112 may be a "Carcinotron" tube. Device 122 also controls the motion of the moving contact of a potentiometer 132, which is fed from a source of D.C. voltage 142, so that the output voltage of the potentiometer is proportional to the desired function of the parameter defining the instantaneous position of the antenna, or in this case E1 ($\varphi 1$)=log $a\ \varphi 1$. This voltage is applied to the modulation input of an amplitude modulator 152, which is also fed by a low-frequency oscillator 162. The output voltage of the modulator 152 is applied to oscillator 112 to modulate it in frequency.

Systems 191 to 195 include respectively elements homologous to those of system 192, i.e. elements 111 to 115, homologous to element 112; elements 121 to 125, homologous to element 122; elements 131 to 135, homologous to element 132; elements 141 to 145, homologous to element 142; elements 151 to 155, homologous to element 152; and elements 161 to 165, homologous to element 162.

Electro-mechanical device 121 oscillates an antenna 101 to provide a sweeping in elevation identical to that of antenna 102, but shifted in phase with respect to it.

Device 123 imposes on antenna 103 a sweeping motion in azimuth with respect to the reference system of origin D″.

Devices 124 and 125 impose on the antennas sweeping motions in azimuth with respect to the reference systems of origins G′ and D′ respectively.

The beams sweep their respective sectors, in turn and always in the same direction, the mechanism controlling the antenna motions producing either an oscillatory motion with an "out" displacement with the beam present, and a "return" displacement with the beam cut off, or a motion which is always in the same direction, the beam being cut off for part of the time.

The idle times corresponding to the motion of the mechanisms with the beams cut off may be followed by halting periods of these mechanisms, so that the beams may sweep in turn the sectors respectively assigned to them.

These various displacements are synchronized by a programmer 230, whose connections to devices 121 to 125 are diagrammatically shown as unifilar connections.

The suppression of the beam during the idle periods is ensured by means of a signal, also supplied by programmer 230 and which blocks the corresponding oscillator 111 to 115.

As an example, the following programs may be adopted, the beams being designated by their respective planes of symmetry:

Beam S″ (distance) sweeps through a 90° sector; the two elevation beams S1 and S2 sweep through a common 20° sector. Beams S′1 and S′2 (definition of the vertical plane P$a$), sweep respectively through two 230° sectors to ensure guidance throughout the length of the runway, and, in the approach direction, up to 50° on either side of plane P$a$.

A complete cycle, i.e. a cycle comprising the sweeping by the five beams of their respective sectors, lasts 1/10 second.

During the first stage, beam S″ sweeps through its sector. To this end, the corresponding antenna rotates continuously (or includes a continuously rotating component) at a speed of 10 revolutions per second, with the beam cut off for 270° of each rotation. The active duration of the sweep (first stage) is then of (9/360) sec.

During the second stage, beam S1 sweeps through its sector. To this end the driving mechanism of the corresponding antenna carries out 10 times in one second an "Out" and "Return" reciprocating motion, with the beam radiating only during the "Out" motion periods and its speed of rotation corresponding to a continuous speed of rotation of 10 rotations per second. The active period (second stage) is then of 2/360 sec.

During a third stage, beam S'1 sweeps through its sector. The corresponding antenna mechanism carries out a continuous rotation at the rate of 20 rotations per second. During alternate revolutions the beam is cut completely off, and during alternate revolutions the beam is present only during the period corresponding to the 230° of the sector to be swept. So beam S'1 sweeps through its sector 10 times in one second, and the active duration (third period) is of (11.5/360) sec., or about (1.30 sec.).

During, the fourth stage, beam S2 sweeps through its sector in the same way as S1. The active duration is of 2/360 sec.

During the fifth stage beam S'2 sweeps through its sector. The arrangement is similar to that provided for S'1. The active duration is then 11.5/360 sec.

The whole cycle thus lasts, exactly 1/10 sec.

The programs has been presented in this way for simplification purposes.

Actually, for switching purposes, it is preferable to leave idle time intervals between the beam sweeps, i.e. intervals during which all the beams are cut off. To this end, a few degrees are easily borrowed from the swept sectors of S'1, S'2 and S'', which is of no practical significance.

Further, the low-frequency oscillators 161 to 165 have separate frequencies $fi$ ($i$=1, 2, 3, 4, 5) and potentiometers 134, 135 and 133 respectively supply voltages proportional to $$E'1=\pi/2-\theta 1,\ E'2=\pi/2-\theta 2 \text{ and } E''=\log b\ p/\tan\ \alpha\ 1$$

while potentiometer 131 supplies a constant voltage E2 independent of the motion of antenna 101. The latter potentiometer is therefore adjusted manually and is not operated by the electro-mechanical device 121.

The source of voltage 142 could be common to the five devices 191 to 195. In the described embodiment it is preferred to use five separate sources 141 to 145, so that the voltage, applied to potentiometers 131 to 135, may be modified in order to take into account any differences between the modulation characteristics of oscillators 111 to 115, or any modifications occurring with time in these characteristics.

To this end, a monitoring receiver 200 is fed by an antenna 210, situated in a monitoring location, whose space coordinates with respect to the various reference systems used are well known. Receiver 200 generates from the received signals error signals, which are applied over cables to the continuous voltage sources 141 to 145 so as to modify the continuous voltages they supply as a function of the error voltages. This monitoring receiver differs from the receiver situated on the aircraft only in respect of its last stages, and this difference will be set forth after the description of the aircraft receivers.

One embodiment of such a receiver is shown in FIGURE 6.

An antenna 92 feeds a conventional superheterodyne receiver 10 which delivers at intermediate frequency the signals received during the successive sweeps of the aircraft by the five beams.

Each one of these signals consists of the carrier wave, which is modulated in frequency by the low-frequency signal $fi$ ($f$1 for E2, $f$2 for E1, $f$3 for E'', $f$4 for E''1, $f$5 for E''2), the latter signal being amplitude modulated by the corresponding function E, the received carrier being also amplitude modulated by the sweeping motion of the lobe, i.e. presenting a maximum amplitude during the sweep of the aircraft by the surface of maximum radiation of the beam.

The output signals from receiver 10 are applied to a limiter 11, which removes any amplitude modulation from these signals. The output signals from limiter 11 are applied to a linear discriminator 12 which supplies the low-frequency signal $fi$ whose level, due to the presence of limiter 11, is independent of the carrier reception level. These signals are amplified in a low-frequency amplifier 13. Amplifier 13 feeds in parallel five filters 21 to 25, respectively centered on frequencies $f$1, $f$2, $f$3, $f$4 and $f$5 and separating the signals respectively received from the various lobes. These signals are respectively detected in five detectors 31 to 35, respectively connected to the outputs of filters 21 to 25, and applied to the signal inputs of, normally open, electronic switches 41 to 45 whose control inputs receive an enabling signal obtained as follows:

A second output of receiver 10 feeds a detector 14, whose output signal, has, at the moment the receiver is swept by the lobe, for example, the form shown, in FIGURE 8$a$. This output signal is applied as gain control to receiver 10 so that the maximum carrier reception level, as the aircraft is swept by any one of the beams, remains approximately constant, this condition however not being imperative, due to the presence of limiter 11, while ensuring a better circuit performance. A second output of detector 14 feeds a differentiating circuit 15 which delivers the signal shown in FIGURE 8$b$.

The shape of the envelope of FIGURE 8$a$ is of course dependent on the shape of the beam. In all cases, the signal obtained by differentiation of the signal representing the envelope has a positive and a negative part, separated by a zero corresponding to the maximum of the envelope. By applying this signal to a circuit 16, including, for example an amplifier 161, a bottom and peak limiter 162 and a differentiator 163 in series, one can obtain at the output of circuit 16 a negative pulse of substantial level, coinciding with the maximum of reception of the lobe, this negative pulse being bracketed by two positive pulses. The output signal from circuit 16 is applied to the control inputs of switches 41 to 45. The switches are so adjusted that they are switched in only for the duration of the control negative pulse, so that they will pass only the central part of the signals detected by detectors 31 to 35.

This provides at the respective outputs of switches 41 to 45, signals F2, F1, F'', F'1 and F'2, which are respectively proportional to the values E2$r$, E1$r$, E''$r$, E'$r$ and E'2$r$ of values E2, E1, E'', E'1 and E'2 as the aircraft is swept by the planes of symmetry of the five beams, the proportionality coefficient being dependent, among other points, on the gain of the low-frequency amplifier 13.

These voltages are respectively applied to the first inputs of devices 51 to 55 each of which consists of a comparator 511 to 551 followed by an integrator 512 to 552. The two inputs of each of these devices are those of the comparator, whose output feeds the integrator, the latter's output being the output of the device.

The second inputs of devices 51 to 55 receive respectively the continuous voltages $e$2, $e$1, $e''$, $e'$1 and $e'$2, which are compared in the comparator of each device 51 to 55 with the corresponding signal F. The output signal from the comparator is integrated in the corresponding integrator, whose time constant is selected to supply an error signal $F-e$; ($F$=$F$1, $F$2, $F''$, $F'$1 or $F'$2 and $e$=$e$1, $e$2, $e''$, $e'$1 or $e'$2) averaged over a few successive sweeps.

Voltages $e$ are obtained as follows: a source of continuous voltage 60 feeds a potentiometer 91, which is suitably adjusted. The output signal from device 51 is applied as gain control to the low-frequency amplifier 13, so as to keep the peak level of the output signal F2 of switch 41 at a constant level equal to $e$2.

Also, source 60 feeds four amplifiers 72 to 75, whose outputs deliver voltages $e1$, $e''$, $e'1$ and $e'2$ and are connected to the second inputs of devices 52 to 55.

The output signals from the comparator of devices 52 to 55, are integrated by the corresponding integrators, and applied as gain control to amplifiers 72 to 75 in order to control the continuous voltages $e1$, $e''$, $e'1$ and $e'2$ by the peak values of the discontinuous signals F1, F'', F'1 and F'2.

There are thus provided five voltages $e$, proportional to the instantaneous values of the five functions E when the aircraft is swept by the surfaces of maximum radiation of the corresponding beams, one of these voltages, such as $e2$, being constant.

The guidance of the aircraft in plane P$a$ of trace OA, shown in FIGURE 4$a$, is effected in an extremely simple manner by the comparison in a center-zero voltmeter 81 of the voltages $e'1$ and $e'2$, respectively collected at the outputs of amplifiers 74 and 75. For the pilot, the observation required is exactly the same as in the case of the arrangement of FIGURE 1$b$.

The voltage collected at the output of amplifier 72 can be written: $e1=e2(e1/e2)=e2.(\log a\ \varphi)/E2$. The voltage collected at the output of amplifier 73 can be written:

$$e''=e2(e''/e2)=e2.(\log b.r)/E2$$

E2 is a constant and $e2$ is held at a constant value; by a suitable choice of units one can have $a=b=1$ and these two voltages can be considered as representing respectively $e2(\log \varphi)/E2$ and $e2(\log r)/E2$.

The aircraft is guided in elevation in the plane P$a$ of trace OA.

If the aircraft were required to land along a straight line OM with slope $\varphi 3$, it would suffice to compare $e1$ with a voltage $e2\ (\log \varphi 3)/E2$, which may be obtained from a variable potentiometer fed from the same source 60 as potentiometer 91.

In the present example, it is desired that the aircraft first follows a line of slope $\gamma o$ which ends at a point $\Omega$ at distance $d$ ahead of O, and then follows the line with a slope $\varphi$, as shown in FIG. 4.

Since angles $\varphi$ and $\gamma$, which represent the elevation angles of the aircraft M as seen respectively from points O and $\Omega$, are small, equalizing the expressions of $m$M, and can write: $\varphi.r=\gamma(r-d)$ and $\log \varphi+\log r=\log \gamma+\log (r-d)$ or: $\log \gamma=\log \varphi+\log r-\log (r-d)$.

There are provided two sources of alternating voltage 80 and 84 of a convenient frequency, such as, for example, 400 c./s., and of opposite phases, which respectively supply reference voltages v. and —v., of the same amplitude and opposite phase O and $\pi$. Voltage $e1$ is modulated at 400 c./s. by voltage v. in a modulator 82 and voltage $e''$ is similarly modulated at 400 c./s. by voltage v. in a modulator 83. Modulators 82 and 83 thus supply alternating voltages respectively representing $\log \varphi$ and $\log r$. Sources 80 and 84 respectively feed two identical logarithmic potentiometers 831 and 832, whose shafts are coupled through a differential 833.

The alternating voltage supplied by potentiometer 831 has a phase O and an amplitude proportional to $\log k'\beta$, where $k'$ is a constant coefficient, and $\beta$ is the angle of rotation of its shaft reckoned from a reference position such that $k'\beta=1$ when this amplitude is zero.

The proportionally coefficients for $\log r$ and $\log k'\beta$ of the voltage supplied by modulator 83 and potentiometer 831 are made equal, this being always obtainable by means of a suitable structure of potentiometer 831, since modulator 83 and potentiometer 831 receive the same alternating reference voltage. A servo mechanism 834 of any suitable known type, fed from these two voltages supplies an error signal $\log r-\log k'\beta$ for positioning the shaft of potentometer 831 on an angle $\beta=r/k'$.

It is possible to make $k'=1$ by an appropriate angular calibration. Through a differential mechanism 833 which shifts angularly by $d$ the shaft of potentiometer 832 with respect to that of potentiometer 831, the shaft of potentiometer 832 becomes positioned on an angle which can be similarly expressed by $(r-d)$, and supplies a voltage representing $-\log (r-d)$, since it is fed from source 84 of phase $\pi$.

Source 84 also feeds a logarithmic potentiometer 821, which is adjusted manually and whose output voltage represents $-\log \gamma o$.

The four voltages, i.e., $\log \varphi$ (supplied by modulator 82), $-\log \gamma o$ (supplied by potentiometer 821), $-\log (r-d)$ (supplied by potentiometer 832) and $\log r$ (supplied by modulator 83) are respectively applied to the input J of a summation amplifier 89 and to the fixed contacts of three switches I1, I2, and I3, whose moving contacts are respectively connected to three other inputs of amplifier 89. The latter has a fifth input connected to the moving contact of a fourth switch I4, whose fixed contact is connected as indicated further on.

It has been assumed that the switches are of the electromechanical type. They can of course be of any other, for example electronic, type.

An arrangement which will also be described further on ensures selectively either the closing of switches I1, I2 and I3, with switch I4 open, or, as shown in the figure, the closing of switch I4 only.

With the switches in the first of these two states, amplifier 89 supplies a voltage representing:

$$\log \varphi+\log r-\log (r-d)\ -\log \gamma o$$

that is to say $\log \gamma-\log \gamma o$, which is zero if the aircraft is gliding along line $\Omega$M of slope $\gamma o$. If the aircraft is not so situated, the phase of the output voltage indicates the sense of the error, while its amplitude increases with the error.

This error signal is detected in an amplitude-phase detector 85 which compares the output voltage from amplifier 89 against the reference voltage v. supplied by source 80. In the figure the connection between detector 85 and source 80 has only been sketched out.

The output signal from detector 85 may, for example, be used to feed a center-zero direct current voltmeter 86, a positive signal indicating too great a height of the aircraft and a negative signal too low a height.

While flying along a curve following the straight flight along the line of slope $\gamma o$, the aircraft has to follow a trajectory defined in plane P$a$, in polar coordinates with respect to center 0 and to axis OA, by arelation $\varphi=f(r)$, this from the instant when the aircraft distance $r$ has dropped to the value $r=ro$.

To this end, potentiometer 831 is coupled directly to a potentiometer 835 whose angle of rotation, like that of 831, expresses $r$. Potentiometer 835 is fed from source 84 of phase $\pi$ and its structure is made such that it supplies the voltage $-\log f\ (r)$. Its output is connected to the fixed contact of switch I4. Switches I1 to I4 have to be in the first state when $r$ is greater than $ro$ and must change to their second state when $r$ drops to the value $ro$. To this end, a potentiometer 87 fed from source 60 supplies a continuous voltage representing $\log ro$, which is compared in circuit 88 against the voltage representing $\log r$ supplied by amplifier 73, circuit 88 actuating switches I1 to I4 in such a way that they are in their first state for $\log r$ greater than $\log ro$ and in their second state for $\log r$ less than $\log ro$. The mechanical or other coupling between circuit 88 and the switches is shown schematically in FIGURE 6 by a dotted line.

With the switches in their second state (as shown in the figure) the amplifier 89 supplies a voltage representing $\log \varphi-\log f\ (r)$, in other words representing $\log \varphi-\log$ ($\varphi$ desired). This error signal is also detected in amplitude-phase detector 85.

Another process of general application consists in defining the whole of the desired trajectory in the vertical plane P$a$ by means of the tangents to the various points T of this trajectory. At any point T ($r$) of the curve, situated at distance $r$ from point O, there corresponds a tangent cutting the axis OA of FIGURE 4$b$ at point $\Omega$ ($r$) situated at distance $d$ ($r$) from point O, this tangent making with axis OA an angle $\gamma$T ($r$) which is the elevation of point T ($r$) seen from Ω ($r$).

The trajectory is then defined by functions $d$ ($r$) and $\gamma$T ($r$).

It should be noted that this way of defining the trajectory is applicable both to a straight and to a curved part of the trajectory, functions $d(r)$ and $\gamma$T($r$) merely remaining constant during the straight part of the trajectory.

It is possible to verify in the following manner that the aircraft is on the trajectory as defined:

With the aircraft at a distance $r$ from point O, point T($r$) of the trajectory, situated at the same distance $r$ of point O, is first considered.

The aircraft is, or is not, on the trajectory according to whether its actual elevation $\gamma$M($r$), as seen from point Ω($r$), is equal or is not equal to $\gamma$T($r$).

As shown above, $$\log \gamma M(r) = \log \gamma + \log r - \log(r-d)$$

with the only difference that in the present case $d$ has no fixed value, its value $d(r)$ depending on $r$.

The receiver of FIGURE 6 can be used for radio guiding according to this principle, subject to the following modifications illustrated by FIGURE 9.

Mechanism 833 is done away with and the shaft of potentiometer 831, which supplies $r$, drives a cam 902 which controls the positioning of the shaft of potentiometer 832 on angle $r-d(r)$, where $r-d(r)$ is also a function of $r$.

Potentiometer 832 thus supplies a voltage representing $-\log [r-d(r)]$. Also, the logarithmic potentiometer 821 is no longer adjusted manually, its shaft being caused to take up a position on angle $\gamma$T($r$) by means of a second cam 901 also driven by the shaft of potentiometer 831.

Summation amplifier 89 and switches I1 to I4 are replaced by a summation amplifier 89' with four fixed inputs which respectively receive the voltages representing: log $\varphi$ (supplied by modulator 82), log $r$ (supplied by modulator 83), [log $r-d(r)$] (supplied by potentiometer 832) and $-\log \gamma$T($r$) (supplied by potentiometer 821).

Thus amplifier 89' supplies the voltage:

$$\log \varphi + \log r - \log (r-d(r)) - \log \gamma T(r) = \log \gamma M(r) - \log \gamma T(r)$$

The error signal supplied by amplifier 89' is detected in amplitude-phase detector 85 and is read on voltmeter 86.

Elements 835, 87 and 88 which have became useless are done away with.

FIGURE 9 shows only the elements which are modified with respect to those of FIGURE 6.

Each of the two arangements provides the possibility of adapting the trajectory to the particular type of aircraft by changing potentiometer 835 or the two cams of arrangements 833' and 833''.

FIGURE 7 shows a modification of the receiver of FIGURE 6 which makes it possible to avoid the effect on the operation of the receiver of possible variations of the characteristics of filters 21 to 25, and of possible differences between the detection characteristics of detectors 31 to 35.

Elements 10 to 16 are the same as in the receiver of FIGURE 6, but the low-frequency amplifier 13 feeds a single detector 30, which thus supplies the signals relative to the five beams. Amplifier 13 also feeds five filters 21' to 25', having respectively the same pass-bands as filters 21 to 25.

These filters feed five detectors 31' to 35'. Detectors 31' to 35' respectively supply the same signals as detector 30, but on five separate outputs, and further these signals may be subject to variations due to the causes mentioned above. This is of no consequence, since they merely supply substantially rectangular signals, of negative polarity, which coincide with the central regions of the signals supplied by detector 30. To this end, the output signals from detectors 31' to 35' are respectively applied to the inputs of five limiter amplifier stages 301 to 305, whose output signals are respectively applied to the first control inputs of five electronic switches 41' to 45'. Each of these switches has a second control input and one signal input, the second control inputs of the five switches being fed in parallel by the output of circuit 16, and the signal inputs by the output of detector 30. Switches 41' to 45' are adjusted to pass the signal applied to their input only if their control inputs simultaneously receive the gating negative signals. So there is finally collected at the output of switch circuits 41' to 45' the same signals respectively as on the outputs of switches 41 to 45 of FIGURE 6, but with the advantage that these signals are supplied by a single detector independent of filter variations, these filters being now used only for generating gating signals.

The monitoring receiver 200 of FIGURE 5 differs from the receivers of FIGURE 6 or 7 only in respect of the following points:

Variable gain amplifier 13 is replaced by an amplifier whose gain is constant, and is not controlled by the output signal from comparator integrator 51.

Voltages $e$1, $e''$, $e'$1 and $e'$2 are supplied, like voltage $e$2, by four respective potentiometers, which are manually adjustable and fed from source 60, said four respective potentiometers thus replacing amplifiers 72 to 75. Each voltage $e$ is adjusted to the level corresponding to the correct value of the signals to be collected at the output of switches 41 to 45 (or 41' to 45') for the fixed gain of amplifier 13 and the known coordinates of receiver 200, and the output signals of various comparators are applied to the adjustable D.C. sources 141 to 145 of the transmitters of FIGURE 5, so as to cancel the error signals supplied by comparators 51 to 55.

It is to be understood that the invention is not limited to the embodiments described and shown which are given merely by way of example and in order to show the extreme flexibility of the arrangement, for defining a surface or a curve according to the invention.

What is claimed is:

1. A transmitter comprising: $n$ transmitting means, where $n$ is an integer greater than one; a programmer having at least $n$ outputs; each of said transmitting means comprising: a radiofrequency oscillator, aerial means coupled to said oscillator for radiating a rotating beam having a maximum radiation surface; means for controlling the rotation of said beam, said last mentioned means having an input coupled to one of said programmer $n$ outputs, means for providing a signal which, in one of said transmitting means, is a constant and which, in any of the ($n-1$) other transmitting means, is indicative of the angular position of said beam, means for modulating said beam with said signal; and a monitoring receiver for controlling the transmitted signals.

2. A transmitter comprising: $n$ transmitting means, where $n$ is an integer greater than one; a programmer having at least $n$ outputs; each of said transmitting means comprising: radiofrequency oscillating means having a modulation input; aerial means coupled to said oscillator for radiating a rotating beam having a maximum radiation surface; means for controlling the rotation of said beam, said last mentioned means having an input coupled to one of said programmer $n$ outputs; a direct current voltage generator having an output; voltage control means having an output for keeping constant said voltage in one of said transmitting means and for varying it as a function of the angular position of said beam in any of the other ($n-1$) transmitting means; a low frequency oscillator having a different frequency in each of said $n$ transmitting means; an amplitude modulator having a modulating input coupled to said voltage control means output for modulating said low frequency oscillator as a function of said direct current voltage, said modulator having an output, coupled to said modulation input.

3. A transmitter comprising: $n$ transmitting means, where $n$ is an integer greater than one; a programmer having at least $n$ outputs; each of said transmitting means comprising: radiofrequency oscillating means having a modulation input oscillator; aerial means coupled to said oscillator for radiating a rotating beam having a maximum radiation surface; means for controlling the rotation of said beam, said last mentioned means having an input coupled to one of said programmer $n$ outputs; a direct current voltage generator having a control input and an output; voltage means having an output for keeping constant said voltage in one of said transmitting means and for varying it as a function of the angular position of said beam in any of the other $(n-1)$ transmitting means; a low frequency oscillator having a different frequency in each of said $n$ transmitting means; an amplitude modulator having a modulating input coupled to said voltage control means output for modulating said low frequency oscillator as a function of said direct current voltage, said modulator having an output, coupled to said modulation input for modulating said beam by said low frequency oscillator; said transmitter further comprising a control receiver, said receiver comprising means for receiving the signals transmitted by said $n$ transmitting means, means for deriving thereof $n$ detected signals, means for elaborating $n$ reference singals; $n$ comparing means for comparing said $n$ detected signals respectively to said $n$ reference signals, said $n$ comparing means having respective outputs respectively coupled to said control inputs of said $n$ direct voltage generators.

4. A transmitter as claimed in claim 3, wherein in order to determine a given vertical plane, $n$ is equal to 2 and the transmitting means comprises respective aerials for radiating beams rotatable about respective vertical axes located outside said vertical plane, the apices of said beams being respectively located on said axes.

5. A transmitter as claimed in claim 3, wherein, in order to determine the approximate distance between a given point located in the ground horizontal plane and in a given vertical plane, and a low altitude point in said given vertical plane, $n$ is equal to two and the transmitting means comprise respective aerials for transmitting beams rotatable about a common vertical axis, located outside said vertical plane, said beams having a common apex located in said horizontal plane on said axis.

6. A transmitter as claimed in claim 3, wherein in order to determine the site of a point located in a given vertical plane, $n$ is taken equal to two and the transmitting means comprises respective aerials for radiating beams rotating about a common horizontal axis orthogonal to said vertical plane, said beams having a common apex located on said axis outside said vertical plane.

7. A transmitter as claimed in claim 3, wherein, in order to determine a given path in a vertical plane, $n$ is equal to five and the first and second transmitting means comprise respective aerials for providing beams rotatable about a common horizontal axis, orthogonal to said vertical plane, said first and second beams having the same apex located on said common axis, outside said vertical plane, the third transmitting means providing a beam rotatable about a vertical axis located outside said vertical plane and crossing said first axis at a point which is the apex of said last mentioned beam; the fourth and fifth transmitting means providing respective beams rotatable about two vertical parallel axes symmetrical relatively to said vertical plane, the apices of said last mentioned beams being located in the ground horizontal plane on the respective axes of said last mentioned beams.

8. A receiver adapted for operating in a radionavigation system wherein, a moving body, carrying said receiver, is guided by means of $n$ successively radiated moving beams where $n$ is an integer greater than one, each of said beams being generated by means of a corresponding carrier wave, modulated by a subcarrier wave, itself modulated by a corresponding information signal, all of said carrier waves having a common frequency, and all of said subcarrier waves having different frequencies; each of said beams having a corresponding surface of maximum radiation; said $n$ beams forming $p$ pairs, where $p$ is an integer smaller than $n$, two pairs differing by at least one beam, and $r$ pairs having a common beam where $r$ is an integer at most equal to $p$, and the two information signals corresponding to the two beams of a pair being such that the ratio of their values when the corresponding surfaces of maximum radiation respectively pass through a point of space indicates that said point is on a given surface, said receiver comprising means including aerial means, for receiving said $n$ carrier waves; means for deriving from said carrier waves, respective gating signals substantially corresponding in time with the sweepings of said aerial means by said surfaces of maximum radiation; means for demodulating said carrier waves to obtain said subcarrier waves; means, including filtering means, detecting means and gating means controlled by said gating signals, for deriving from said subcarriers short signals respectively corresponding to said information signals, and coinciding in time with said gating signals; means for generating and storing $n$ continuous signals respectively proportional to said short signals, one of said $n$ continuous signals, corresponding to the information signal transmitted by means of said beam common to $r$ pairs, having a constant value.

9. A receiver adapted for operating in a radionavigation system in which a moving body, carrying said receiver, is guided along a given path located in a given vertical plane, by means of five successively radiated moving beams, each of said beams being respectively generated by means of corresponding first to fifth carrier waves modulated respectively by a first, a second, a third, a fourth and a fifth subcarrier, respectively modulated by a first, a second, a third, a fourth and a fifth signals all of said carrier waves having a common frequency, and all of said subcarrier waves having different frequencies; each of said beams having a corresponding surface of maximum radiation; the first and second of said signals varying in such a manner that their equality, when the corresponding surfaces of maximum radiation respectively pass, through a point of space, indicates that said point is in said vertical plane; the third of said signals being a constant; the fourth of said signals varying in such a manner that the ratio of the values of said fourth and third signals when the corresponding surfaces of maximum radiation pass through a point of space indicates the abscissa of said point along a horizontal axis of said vertical plane; the fifth of said signals varying in such a manner that the ratio of the values of said fifth and third signals when the corresponding surfaces of maximum radiation respectively pass through a point of space indicates the elevation of said point seen from a predetermined point of said vertical plane; said receiver comprising means, including aerial means, for receiving said carrier waves; means for deriving from said carrier waves respective gating signals substantially corresponding in time with the sweepings of said aerial means by said surfaces of maximum radiation; means for demodulating said carrier waves to obtain said subcarrier waves; means including filtering means, detecting means and gating means, controlled by said gating signals, for deriving from said subcarriers a first, a second, a third, a fourth and a fifth short signal respectively corresponding to said first to fifth information signals, and coinciding in time with said gating signals; means for generating and storing a first, a second, a third and fourth and a fifth continuous signal respectively proportional to said short signals, the continuous signal corresponding to said third information signal being a signal of constant level; means for comparing said first and second continuous signals and deriving therefrom an error signal; means for generating a reference signal which is a function of said fifth continuous signal, and means for comparing said fourth continuous signal to said reference signal for deriving therefrom a second error signal.

10. A receiver as claimed in claim 9, wherein said carrier waves being frequency modulated and said subcarrier waves being amplitude modulated, said demodulating means are a frequency demodulator, and wherein said means for deriving said gating signals comprise a detector followed in series by a first differentiator, an amplifier, a base and peak clipper and a second differentiator, and wherein said means for deriving said short signals comprise an amplifier coupled to said frequency demodulator, and feeding five channels each of which comprises a filter, a detector, a gate having a signal input coupled to said last mentioned detector and a control input, said gating signals being applied to said control inputs of said gates.

11. A receiver as claimed in claim 9 wherein said carrier waves being frequency modulated and said subcarrier waves being amplitude modulated, said demodulating means are a frequency demodulator having an output, and wherein said means for deriving said gating signals comprises a first detector followed in series by a first differentiator, a first amplifier, a base and peak clipper and a second differentiator, and wherein said means for deriving said short signals comprises a second amplifier having an input coupled to said frequency demodulator output and an output, a second detector having an input coupled to said second amplifier output, and an output, a first, a second, a third, a fourth and a fifth channel coupled in parallel to said second amplifier output, each of which comprises a filter, a detector, a gate having a first control input coupled to said last mentioned detector, a signal input coupled to said output of said second detector, a second control input and an output, said gating signals being applied to all of said second control inputs of said gates.

12 A receiver, as claimed in claim 11, wherein said second amplifier is a variable gain amplifier having a control input, and wherein said means for generating and storing said continuous signals comprise means for generating an adjustable direct voltage, first comparing and integrating means for comparing said voltage with said third short signal and providing a continuous error signal which is applied to said control input of said variable gain amplifier; a first, a second, a third and a fourth identical circuit, each circuit comprising a variable gain amplifier coupled to said direct voltage generator and having a control input, comparing means having a first input coupled to said last mentioned amplifier, a second input, and an output, an integrator having an input coupled to said output of said comparing means and an output coupled to said control input of said last mentioned amplifier, said second inputs of said comparing means of said first to fourth identical circuits being respectively coupled to said gate outputs of said first, second, fourth and fifth channels.

13. A receiver as claimed in claim 12, wherein, said path comprising a first portion and a second portion, the junction point of said portions corresponding to a given value of said fifth continuous signal, said reference signal being a first function of said fifth signal along said first portion, and being a second function of said fifth signal along said second portion, said reference signal generating means comprising a first generator of function having an input and an output, a second generator of function having an input and an output, said fifth continuous signal being applied to said inputs of said function generators, and wherein said receiver comprises further comparing means for deriving a control signal, said further comparing means having a first input coupled to said direct voltage generating means, a second input coupled for receiving said fifth continuous signal, and an output; said means for comparing said fourth continuous signal to said reference signal comprising a control input coupled to said further comparing means output; and being responsive to said control signal for selectively comparing said fourth continuous signal to the output signals of said first and second function generators.

References Cited by the Examiner

UNITED STATES PATENTS

| | | | |
|---|---|---|---|
| 2,495,766 | 1/1950 | Reade | 343—106 |
| 2,943,321 | 6/1960 | Karpeles | 343—107 X |
| 2,977,592 | 3/1961 | Bruck | 343—108 |
| 3,157,877 | 11/1964 | Tatz et al. | 343—108 |
| 3,161,880 | 12/1964 | Swanson et al. | 343—112 X |
| 3,191,175 | 6/1965 | Battle et al. | 343—108 X |
| 3,209,356 | 9/1965 | Smith | 343—105 |

CHESTER L. CURTUS, *Primary Examiner.*

H. C. WAMSLEY, *Assistant Examiner.*